United States Patent [19]

Meixner et al.

[11] Patent Number: 5,136,008
[45] Date of Patent: Aug. 4, 1992

[54] POLYURETHANE CONTAINING ACRYLOYL OR METHACRYLOYL GROUPS, AND A PROCESS FOR THEIR PRODUCTION AND THEIR USE

[75] Inventors: Jürgen Meixner, Krefeld; Wolfgang Fischer, Meerbusch, both of Fed. Rep. of Germany

[73] Assignee: Bayer Aktiengesellschaft, Leverkusen, Fed. Rep. of Germany

[21] Appl. No.: 744,607

[22] Filed: Aug. 13, 1991

[30] Foreign Application Priority Data

Aug. 25, 1990 [DE] Fed. Rep. of Germany ....... 4026885

[51] Int. Cl.$^5$ ............................................. C08G 18/67
[52] U.S. Cl. ........................................................ 528/49
[58] Field of Search ............................................ 528/49

[56] References Cited

U.S. PATENT DOCUMENTS

| | | | |
|---|---|---|---|
| 3,782,961 | 1/1974 | Takahashi et al. | 96/115 R |
| 4,225,695 | 9/1980 | Schuster et al. | 528/75 |
| 4,870,152 | 9/1989 | Meixner et al. | 538/49 |

FOREIGN PATENT DOCUMENTS 1159551 7/1969 United Kingdom .
1159552 7/1969 United Kingdom .

*Primary Examiner*—Maurice J. Welsh
*Attorney, Agent, or Firm*—Joseph C. Gil

[57] ABSTRACT

The present invention is directed to polyurethanes containing (meth)acryloyl groups and to a method of manufacture thereof. The polyurethanes are produced by reacting a) a polyisocyanate component of which at least 50 NCO-equivalent-% consists of at least one acyclic aliphatic diisocyanate containing 6 to 12 carbon atoms in the aliphatic radical, b) an alcohol component containing (meth)acryloyl groups consisting essentially of a monohydric alcohol containing (meth)acryloyl groups and having a molecular weight of from 116 to 1000, c) at least one $\beta,\gamma$-ethylenically unsaturated ether alcohol containing 5 to 14 carbon atoms, and d) at least one polyhydric alcohol, at an NCO:OH equivalent ratio, based on all the starting components a) to d), of from 0.5:1 to 1:1.

2 Claims, No Drawings

POLYURETHANE CONTAINING ACRYLOYL OR METHACRYLOYL GROUPS, AND A PROCESS FOR THEIR PRODUCTION AND THEIR USE

BACKGROUND OF THE INVENTION

The present invention relates to polyurethanes containing certain (meth)acryloyl groups (as used herein, the term "(meth)acryloyl" means acryloyl or methacryloyl) which can be converted by radiation curing into crosslinked products, even in the presence of atmospheric oxygen, using peroxides or hydroperoxides, to a process for their production. The products herein may be used as binders for coating or surfacing compounds and for the production of moldings.

Polyurethanes containing (meth)acryloyl groups which are obtained as a reaction product of polyisocyanates and hydroxyalkyl acrylations or methacrylates, as described for example in German Offenlegungsschriften 1,644,798, 2,115,373 or 2,737,406, are known. They are cured by high-energy radiation, such as UV light or electron beams, and are used for coating, for example wood, or for the production of coatings for graphic purposes.

German Offenlegungsschrift 3,737,244 describes polyurethanes containing (meth)acryloyl groups which can be crosslinked not only by radiation, but also by peroxides. However, this advantage is acquired at the expense of using special isocyanurate polyisocyanates prepared in a separate step as starting material for the production of the polyurethanes.

The problem addressed by the present invention was to provide polyurethanes containing (meth)acryloyl groups based on simple, inexpensive aliphatic diisocyanates which could be cured not only by radiation, but also using peroxides in the presence of atmospheric oxygen and which, at the same time, would be at least equivalent to the known systems in regard to the viscosity and technical properties of the resulting products.

DESCRIPTION OF THE INVENTION

The above problem has been solved by the polyurethanes containing (meth)acryloyl groups according to the invention which are described n detail hereinafter.

The present invention relates to a process of preparing polyurethanes containing (meth)acryloyl groups by reacting a) 25 to 55% by weight of a polyisocyanate component of which at least 50 NCO-equivalent-% consists of at least one acyclic aliphatic diisocyanate containing 6 to 12 carbon atoms in the aliphatic radical, b) 10 to 30% by weight of an alcohol component containing (meth)acryloyl groups consisting essentially of a monohydric alcohol containing (meth)acryloyl groups and having a molecular weight of from 116 to 1000, c) 11 to 35% by weight of at least one $\beta,\gamma$-ethylenically unsaturated ether alcohol containing 5 to 14 carbon atoms, d) 8 to 40% by weight of at least one polyhydric alcohol, said percents adding up to 100, at an NCO:OH equivalent ratio, based on all the starting components a) to d), of from 0.5:1 to 1:1.

The present invention also relates to the polyurethanes containing (meth)acryloyl groups prepared by the above described process.

At least 50 NCO-equivalent-% of the polyisocyanate component a) to be used in accordance with the invention consists of an acyclic c aliphatic diisocyanate containing 6 to carbon atoms in the aliphatic radical.

The polyisocyanate component a) may contain up to 50 NCO-equivalent-% of other polyisocyanates containing aliphatically, aromatically and/or cycloaliphatically bound isocyanate groups. These other polyisocyanates include, for example, tolylene diisocyanate, 1-isocyanato-3,3,5-tri-methyl-5-isocyanatomethyl cyclohexane (IPDI), isocyanurate-containing polyisocyanates based on IPDI or hexamethylene diisocyanate or urethane-containing polyisocyanates based on IPDI or hexamethylene diisocyanate and polyhydric alcohols, such as trimethylol propane for example. At least 80 NCO-equivalent-% of the polyisocyanate component a) preferably consists of an acyclic aliphatic diisocyanate containing 6 to 12 carbon atoms in the aliphatic radical.

In a particularly preferred embodiment, the polyisocyanate component a) consist: of hexamethylene diisocyanate or trimethyl hexamethylene diisocyanate (i.e., 2,2,4- and/or 2,4,4-trimethyl hexamethylene diisocyanate).

Component b) is a monohydric alcohol containing (meth)acryloyl groups or a mixture of such alcohols. The alcohols in question are understood to be both esters of acrylic or methacrylic acid with dihydric alcohols containing a free hydoroxyl group, such as for example 2-hydroxyethyl,-1-methyl2-hydroxyethyl-,2-hydroxypropyl-,3-hydroxypropyl-(meth)acrylate, the isomer hydroxybutyl-(meth)acrylates and mixtures of such compounds. In addition, component b) or part of component b) may also be a monohydric alcohol containing (meth)acryloyl groups or reaction products consisting essentially of such alcohols which are obtained by esterification of n-hydric alcohols with (meth)acrylic acid. The alcohols used may even be mixtures of different alcohols, so that n is a whole number or, on a statistical average, a number of greater than 2 and up to 4, preferably 3, from n minus 0.8 to n minus 1.2 and preferably n minus 1 mole (meth)acrylic acid are used per mole of the alcohols mentioned. These compounds or product mixtures include, for example, reaction products of i) glycerol, trimethylol propane, pentaerythritol, low molecular weight alkoxylation products of such alcohols (such as, e.g., ethoxylated or propoxylated trimethylol propane, such as for example the adduct of ethylene oxide with trimethylol propane having an OH number 550), mixtures thereof, or mixtures of these trihydric alcohols with dihydric alcohols, such as for example ethylene glycol or propylene glycol, with (ii) (meth)acrylic acid in the molar ratios mentioned.

The compounds of component b) have a molecular weights of from 116 to 1000, preferably from 116 to 750 and more preferably from 116 to 158.

Component c) is at least one $\beta,\gamma$-ethylenically unsaturated ether alcohol containing 5 to 14 carbon atoms. Compounds such as these are understood to be compounds which, in addition to an alcoholic hydroxyl group, contain at least one and preferably at least two $\beta,\gamma$-ethylenically unsaturated ether groups having the following structure

Specific examples include 2-hydroxyethyl allyl ether, glycerol diallyl ether, trimethylol propane diallyl ether and pentaerythritol triallyl ether. Trimethylol propane diallyl ether is preferred. These compounds are generally technical products, i.e. reaction products of the polyhydric alcohols on which the ether compounds are based with allyl chloride which, in addition to monohydric ether alcohols, contain small quantities of the corresponding dihydric alcohols and/or the corresponding hydroxyl-free allyl ethers.

Component d) is a polyhydric alcohol having a molecular weight of from 62 to 2,000. Suitable alcohols of this type are, in particular, simple, at least trihydric alcohols having molecular weights of from 92 to 200, such as for example glycerol, trimethylol propane, pentaerythritol and/or sorbitol. Other suitable alcohols include polyether polyols having molecular weights of up to 2,000 and preferably up to 1,000 which may be obtained by alkoxylation of simple alcohols of the type mentioned by way of example; and, polyester polyols having molecular weights in the range mentioned which may be obtained in known manner by reaction of polyhydric alcohols and polybasic acids or arhydrides of polybasic acids. Relatively small quantities of diols, such as ethylene glycol, thiodiglycol or hexarediol, may also be used. However, diols such as these are preferably used in quantities of at most up to 50 hydroxyl equivalent % based on component d).

The production of the polyurethanes by reaction of the starting components mentioned may be carried out in bulk or in isocyanate-inert solvents, such as for example acetone, methyl ethyl ketone, cyclohexane, toluene, ethyl acetate, butyl acetate, low molecular weight esters of (meth)acrylic acids or mixtures of such solvents. The reaction is preferably carried out at temperatures of 20° to 100° C. and more preferably at temperatures in the range from 40° to 80° C. The reaction may be carried out, for example, by initially in introducing polyisocyanate component a) and components b) and c) together or successively (in any order) and then adding component d) or by initially introducing components b) c) and d) and then adding the polyisocyanate component a).

In either case, the reaction, conducted at an NCO-:OH equivalent ratio of 0.5:1 to 1:1, is carried out under mild conditions, for example at temperatures within the range mentioned above, until the NCO content has fallen to below 0.1% by weight.

The polyurethane-forming addition reaction may be carried out in known manner by suitable catalysts, such as for example tin octoate, dibutyl tin dilaurate or tertiary amines, such as dimethyl benzylamine. On the other hand, the urethane (meth)acrylate obtained as the reaction product may be protected against premature and unwanted polymerization by addition of suitable inhibitors and antioxidants, such as for example phenols and/or hydroquinones, in quantities of 0.001 to 0.3% by weight, based on the weight of all the components. These auxiliaries may be added before, during and/or after the reaction.

The products according to the invention are generally clear, medium-viscosity to high-viscosity colorless liquids. The polyurethanes containing (meth)acryloyl groups, which represent precursors of plastics, are converted into cured plastics generally after preliminary forming.

In the context of the invention, the expression "molding" is understood to include 3-dimensional cured moldings, cured cements, surfacing compounds and flat materials (more particularly cured paint coatings). In a particularly preferred embodiment the polyurethanes according to the invention are used as paint binders for the production of paint coatings, for example on paper, paperboard articles, leather, wood, plastics, nonwovens, textiles, ceramic materials, mineral materials, glass, metals and artificial leather.

Depending on the application and the viscosity, the polyurethanes containing (meth)acryloyl groups may be mixed before forming with inert auxiliaries and additives of various kinds, including filters, pigments, dyes, thixotropicizing agents, smoothing agents, flatting agents and flow control agents, which may be used in the usual quantities. For the production of paint coatings in particular, the polyurethanes containing (meth)acryloyl groups may also be used in solution in paint solvents of the type generally known in the art, in admixture with copolymerizable monomers or emulsified in water.

Examples of suitable copolymerizable monomers are organic compounds containing at least one copolymerizable olefinic double bond per-molecule and having a viscosity at 23° C. of at most 500 mPa.s, including for example styrene, hexane-1,6-diol diacrylate, trimethylol propane triacrylate or N-vinyl pyrrolidone.

The inert solvents and also the copolymerizable monomers may be used in quantities of up to 100% by weight and preferably in quantities of up to 50% by weight, based on the weight of the polyurethanes containing (meth)acryloyl groups.

It is also possible to use both inert solvents of the type mentioned by way of example and also copolymerizable monomers of the type mentioned by way of example at the same time.

If the polyurethanes containing (meth)acryloyl groups are to be processed from aqueous emulsion, the preparation of corresponding aqueous emulsions may be carried out, for example, using external emulsifiers and, optionally, auxiliaries typically used in the emulsion field.

Emulsifiers suitable for this purpose are known and are described, for example, in Ullmanns Encyclopädie der technischen Chemie, Vol. 10, 4th Edition, pages 449 et seq.

Preferred emulsifiers are copolymerizable polyurethane emulsifiers containing (meth)acryloyl groups of the type described in German Offenlegungsschrift 3,900,257.

The aqueous emulsions generally contain 10 to 70% by weight and preferably 30 to 70% by weight of the polyurethanes containing (meth)acryloyl groups essential to the invention. The emulsions may be prepared by stirring water into the mixture of polyurethane (meth)acrylate according to the invention and emulsifier, for example by simple stirring or by means of a dissolver.

To form a finely divided emulsion, i.e., in order better to introduce the shear forces, water is advantageously added in portions at temperatures below 30° C. Given optimal shearing, oil-in-water emulsions are formed.

The products used in accordance with the invention are cured, optionally after evaporation of volatile auxiliaries, such as inert solvents or water, either by high energy radiation, such as UV light, electron beams or gamma rays, or by curing with metal salts of siccatives and peroxides or hydroperoxides at temperatures between room temperature and 250° C. Other compounds, which may start a crosslinking reaction through the formation of radicals, may also be added. It is also possible to carry out a combination of (hydro)peroxide-initiated crosslinking and crosslinking by high-energy radiation, for example to obtain an opaquely pigmented coating in accordance with German Offenlegungsschrift 3,612,442.

Where crosslinking is carried out by UV irradiation, photoinitiators have to be added to the coating compounds. Suitable photoinitiators are the compounds normally used which are described, for example, in the book by J. Korsar entitled "Light-Sensitive Systems", J. Wiley & Sons, New York—London—Sydney, 1965. Other suitable photoinitiators are benzoin ethers, such as benzoin isopropyl ether, benzil ketals, such as for example benzil dimethyl ketal, and hydroxyalkyl phenones, such as for example 2-hydroxy-2-methyl phenyl propan-1-one.

The photoinitiators mentioned which, depending on the application envisaged for the compounds according to the invention, are used in quantities of 0.1 to 10% by weight and preferably in quantities of 0.1 to 5% by weight, based on the weight of the reaction products, may be used either individually or, by virtue frequently of advantageous synergistic effects, even in combination with one another.

The siccatives optionally used include, for example, cobalt, lead or manganese salts of acids, such as linseed oil fatty acid, naphthenoic acid, or of acetic acid and isooctanoic acid. They are generally used, if at all, in such quantities that the metal content, based on the weight of the dispersed polyurethanes, corresponds to 0.001 to 1% by weight.

Examples of suitable peroxides and hydroperoxides include dicumyl peroxide, di-tert-butyl peroxide, benzoyl peroxide, cyclohexanone peroxide, methyl ethyl ketone peroxide, acetyl acetone peroxide, dinonyl peroxide, bis-(4-tert-butylcyclohexyl)-peroxydicarbonate, tert-butyl hydroperoxide, 2,5-dimethylhexane-2,5-hydroperoxide, diisopropyl benzene monohydroperoxide and hydrogen peroxide. These peroxides and/or hydroperoxides are used in quantities of 1 to 10% by weight, based on the weight of the polyurethanes containing (meth)acryloyl group:.

In the following Examples, all percentages are by weight.

EXAMPLES

The quantity of component a) shown in Table 1 is dissolved in butyl acetate (see Table) together with 0.2% tin dioctoate and 0.1% 2,6-di-tert-butyl-p-cresol and the resulting solution is heated to 50° C. while air is passed through. Component b) is then added dropwise in the quantity shown in Table 1, followed by components c) and d) in the quantities shown. A reaction temperature of 60° C. attributable to the exothermic reaction should not be exceeded. The mixture is then kept at 60° C. until the NCO content has fallen to below 0.1%.

TABLE 1

|  | Examples |  |  |  |  | Comparison Examples |  |  |
|---|---|---|---|---|---|---|---|---|
|  | 1 | 2 | 3 | 4 | 5 | 6 | 7 | 8 |
|  | Quantities weighed in (%) | | | | | | | |
| Component a) | | | | | | | | |
| Hexamethylene diisocyanate | 44.5 | — | 43.7 | 38.7 | 45.8 | 49.0 | 42.3 | — |
| Trimethyl hexamethylene diisocyanate* | — | 50.1 | — | — | — | — | — | — |
| Isophorone diisocyanate | — | — | — | — | — | — | — | 51.5 |
| Component b) | | | | | | | | |
| Hydroxyethyl acrylate | 15.4 | 13.8 | — | 13.4 | 15.8 | 28.7 | 8.8 | 13.4 |
| Hydroxyethyl methacrylate | — | — | 16.9 | — | — | — | — | — |
| Component c) | | | | | | | | |
| Trimethylol propane diallyl ether | 28.4 | 25.5 | 27.9 | 24.6 | 29.2 | 9.4 | 37.7 | 24.8 |
| Component d) | | | | | | | | |
| Trimethylol propane | 11.7 | 10.6 | 11.5 | — | — | 12.9 | 11.2 | 10.3 |
| 4 × Ethoxylated TMP** | — | — | — | 23.3 | — | — | — | — |
| Pentaerythritol | — | — | — | — | 9.2 | — | — | — |
| Butyl acetate (solvent) | 25.0 | 25.0 | 25.0 | — | 33.3 | 25.0 | 25.0 | 33.3 |
| Viscosity (23° C., mPa.s) | 5188 | 15640 | 5460 | 197380 | 1031 | Cryst. | 5576 | 1077 |

*Technical mixture of the 2,2,4- and 2,4,4-isomers
**TMP = Trimethylol propane

APPLICATION EXAMPLES

The product of Comparison Example 6 could not be used because it could not be applied due to its crystallinity. In the interests of clarity, the numbering of the following Comparison Examples corresponds to the numbering of the preceding production Examples.

a) Photochemical curing

Quantities of 5% benzophenone are added to the products of the remaining Examples and Comparison Examples. After application to cardboard (in a thickness of 10 μm), the paint films are moved past beneath a Hanovia lamp (80 W/cm, 10 cm distance). The value shown in Table 2 for reactivity represents the belt speed at which a solvent resistant and scratch-resistant coating was obtained.

In this case, "solvent-resistant" means that the paint film is still satisfactory in appearance after at least 20 double wipes with a cloth soaked in butyl acetate.

b) Peroxide curing

Quantities of 3% tert-butyl perbenzoate and 2% cobalt octoate (2.2% metal content) are added to the products of the Examples according to the invention and Comparison Examples 7 and 8. After application to glass plates (in a layer thickness of 90 μm), the paint films are heated at 80° C.

The time which the paint films take to harden to a tack-free state are shown in Table 2. After drying, all the paint film surfaces are scratch-resistant apart from that of Comparison Example 8.

TABLE 2

|  | 1 | 2 | 3 | 4 | 5 | 7 | 8 |
| --- | --- | --- | --- | --- | --- | --- | --- |
| Photochemical curing Reactivity (m/min.) | 15 | 15 | 15 | 15 | 20 | 10 | 10 |
| Peroxide curing Drying time (mins.) | 5 | 10 | 10 | 5 | 5 | 25 | 10 |
| Scratch resistant | Yes | Yes | Yes | Yes | Yes | Yes | No |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Polyurethanes containing (meth)acryloyl groups which have been produced by reacting
    a) 25 to 55% by weight of a polyisocyanate component of which at least 50 NCO-equivalent-% consists of at least one acyclic aliphatic diisocyanate containing 6 to 12 carbon atoms in the aliphatic radical,
    b) 10 to 30% by weight of an alcohol component containing (meth)acryloyl groups consisting essentially of a monohydric alcohol containing (meth)acryloyl groups and having a molecular weight of from 116 to 1000,
    c) 11 to 35% by weight of at least one $\beta,\gamma$-ethylenically unsaturated ether alcohol containing 5 to 14 carbon atoms,
    d) 8 to 40% by weight of at least one polyhydric alcohol, said percents adding up to 100, at an NCO:OH equivalent ratio, based on all the starting components a) to d), of from 0.5:1 to 1:1.

2. A process for the production of polyurethanes containing (meth)acryloyl groups comprising reacting
    a) 25 to 55% by weight of a polyisocyanate component of which at least 50 NCO-equivalent-% consists of at least one acyclic aliphatic diisocyanate containing 6 to 12 carbon atoms in the aliphatic radical,
    b) 10 to 30% by weight of an alcohol component containing (meth)acryloyl groups consisting essentially of at least one monohydric alcohol containing (meth)acryloyl groups and having a molecular weight of from 116 to 1000,
    c) 11 to 35% by weight of at least one $\beta,\gamma$-ethylenically unsaturated ether alcohol containing 5 to 14 carbon atoms,
    d) 8 to 40% by weight of at least one polyhydric alcohol, said percentages adding up to 100, at an NCO:OH equivalent ratio, based on all the starting components a) to d), of from 0.5:1 to 1:1.

* * * * *